United States Patent [19]

De Fazio

[11] Patent Number: 4,523,409
[45] Date of Patent: Jun. 18, 1985

[54] AUTOMATIC CONTOUR GRINDING SYSTEM

[75] Inventor: Thomas L. De Fazio, Watertown, Mass.

[73] Assignee: The Charles Stark Draper Laboratory, Inc., Cambridge, Mass.

[21] Appl. No.: 495,982

[22] Filed: May 19, 1983

[51] Int. Cl.³ .............................................. B24B 49/00
[52] U.S. Cl. ............................. 51/165.71; 51/165.72; 51/165.77; 901/44
[58] Field of Search ........... 51/165.71, 165.72, 165.77, 51/165 R; 901/41, 44, 45

[56] References Cited

U.S. PATENT DOCUMENTS

| | | | |
|---|---|---|---|
| 3,827,190 | 8/1974 | Moriguchi | 51/165.72 |
| 4,137,677 | 2/1979 | Nedreski | 51/165.77 |
| 4,248,019 | 2/1981 | Hawley | 51/165.77 |
| 4,268,999 | 5/1981 | Noto | 51/165.72 |
| 4,302,286 | 11/1981 | Lefebvre | 901/44 |
| 4,370,834 | 2/1983 | Habib | 51/165.72 |
| 4,380,138 | 4/1983 | Hofer | 901/41 |

Primary Examiner—Harold D. Whitehead
Attorney, Agent, or Firm—Joseph S. Iandiorio; William E. Noonan

[57] ABSTRACT

An automatic contour grinding system for smoothing a surface, including: a robot; a robot controller; a grinder device mounted to the robot; means for monitoring the grinding action of the grinder device; means, responsive to the means for monitoring, for determining the vector position of the grinder area in contact with the contour to be smoothed; means, responsive to the means for monitoring, for detecting the material being ground; a contour data base for providing the predetermined shape of the contour being ground; and a controller driver unit responsive to the contour data base, the means for determining the vector position, and the means for detecting to grind until there is achieved the shape of the contour being ground.

35 Claims, 18 Drawing Figures

AUTOMATIC CONTOUR GRINDING SYSTEM

FIELD OF INVENTION

This invention relates to an automatic contour grinding system for smoothing a surface.

BACKGROUND OF INVENTION

In fabrications, especially those made of sheet metal, it is often desirable to provide a finished product in which the welds or joints which interconnect a number of pieces are hidden so that the entire product appears as a single uniform piece with smooth, uninterrupted lines. To accomplish this the welds or joints may be disposed in a recess or trench which is subsequently filled with a filler, such as lead if the fabrication is of steel, which is then ground down to match the flow of the surfaces surrounding the weld trench. Lead is the preferred filler for steel sheet fabrications because it adheres well to steel and similar metals and is easy to work. The lead or other filler is smoothed to the proper contour, usually by grinding with a motor-driven grinder operated by a man. A number of shortcomings occur from this approach. Information indicates that lead dust, vapors and particles are a health hazard and could be dangerous to grinder operators. As a result extreme caution surrounds the grinding of such lead fillers, including double locker rooms, clean suits, showers and other extreme, time-consuming, expensive measures.

SUMMARY OF INVENTION

It is therefore an object of this invention to provide an improved automatic contour grinding system for smoothing a surface.

It is a further object of this invention to provide such a system which employs robotics and automation to remove human operators to a safer environment.

It is a further object of this invention to provide an improved automatic contour grinding system for smothing a surface of more than one material.

It is a further object of this invention to provide such a system which employs the differences between the response of a primary material and the filler material to distinguish what the grinder is grinding.

It is a further object of this invention to provide such a system which relies on a characteristic of a response of a material, such as friction, or sound, or light occuring during grinding, to distinguish the material.

It is a further object of this invention to provide such a system which responds to the detection of a material being ground to guide the grinder device to grind along the surface until a desired contour is achieved.

This invention features an automatic contour grinding system for smoothing a surface. It includes a robot, a robot controller, and a grinder device mounted to the robot. There are means for monitoring the grinding action of the grinder device and means responsive to the means for monitoring for determining the vector position $\bar{r}$ of the grinder area in contact with the contour to be smoothed with respect to the grinder spindle, in tool coordinates. Means responsive to the means for monitoring detect the material being ground, and a contour data base provides the shape of the contour being ground. A controller driver unit is responsive to the contour data base, the means for determining the vector position and the means for detecting, for driving the grinder device to grind until there is achieved the shape of the contour being ground.

In a preferred embodiment, the means for monitoring may include a force sensor for sensing forces occurring relative to the grinder axes. The force sensor may provide the forces $F_x$ and $F_y$ and the moment $M_z$. The means for determining the vector position may include means for calculating the vector $\bar{r}$:

$$\bar{r} = \left( \frac{M_z F_y}{F_x^2 + F_y^2} \right) \bar{i} + \left( \frac{M_z F_x}{F_x^2 + F_y^2} \right) \bar{j}$$

as explained hereinafter. The means for detecting may include means for distinguishing the coefficients of friction of the materials being ground. The force sensor may provide the forces $F_x$, $F_y$ and $F_z$, and the means for distinguishing may include means for calculating the coefficient of friction $\mu$:

$$\mu \approx \frac{\sqrt{F_x^2 + F_y^2}}{F_z}$$

of the material being ground.

The means for monitoring may also include an acoustical sensor for sensing the sound of the material being ground. The means for monitoring may also include means for indicating the speed of the grinder area in contact with the contour to be ground. The means for detecting may include means responsive to the acoustical sensor and the means for indicating the speed, if any, for distinguishing the material being ground.

The means for monitoring may include an optical sensor for sensing light generated by the material being ground. The means for detecting may include means responsive to the optical sensor and the means for indicating the speed, if any, for distinguishing the light produced by the materials being ground.

The controller driver unit may include means for establishing a path of travel for the grinder device over the contour to be ground, means for controlling the angle of the grinder relative to the contour, and means for defining when the contour grinding is completed. The system may use any one or more of the means for detecting the coefficient of friction, sound or light, or other suitable approaches.

DISCLOSURE OF PREFERRED EMBODIMENTS

Other objects, features and advantages will occur from the following description of a preferred embodiment and the accompanying drawings, in which.

Figure 1:
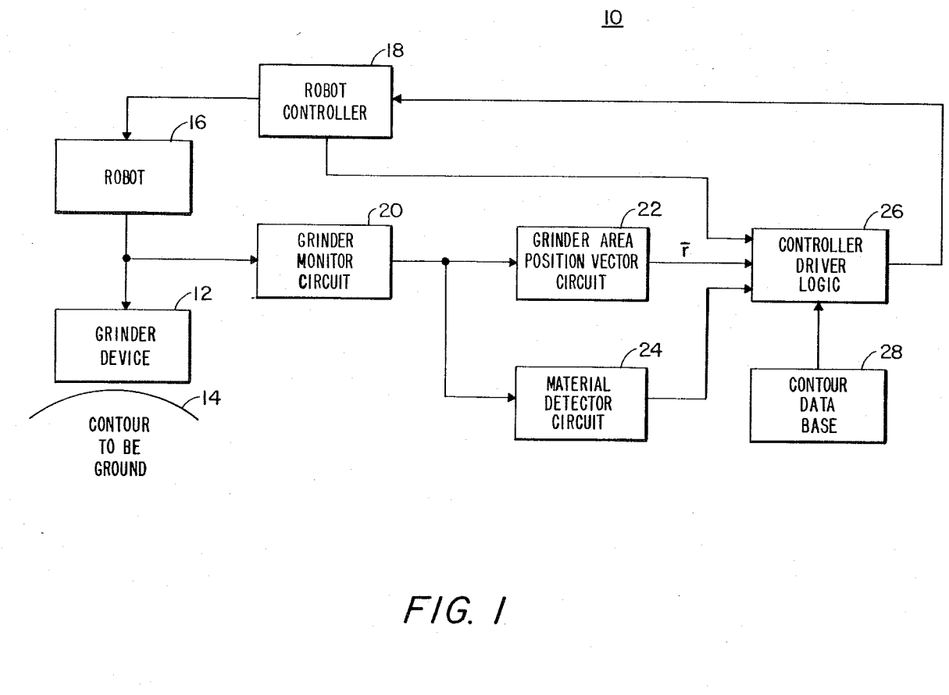
FIG. 1 is a block diagram of an automatic contour grinding system according to this invention.

There is shown in FIG. 1 an automatic contour grinding system 10 according to this invention, including a grinder device 12 for grinding a contour 14. Grinder device 12 is driven by robot 16, which is operated by robot controller 18. Grinder monitor circuit 20 monitors the action of grinder device 12 and provides one or more functions of that action and its output to grinder area position vector circuit 22 and material detector circuit 24. Grinder area position vector circuit 22 determines the vector location of the area of the grinder which is actually in contact with the contour to be ground. This vector, $\bar{r}$, along with the identification of the material currently being ground by grinder 12, as indicated by detector circuit 24, is delivered to controller driver logic 26, which in conjunction with the input from the contour data base 28 provides an output defining the grinding point path, and the angle of tilt of the grinder to controller 18 as well as an indication that the grinding task is finished when the desired contour has been achieved. Driver logic 26 moves the grinding control area over some path on the surface to be ground. Robot controller 18 supplies information on the grinder spindle location and orientation; the position vector, $\bar{r}$, determination provides information relating to the location of the grinding contact area relative to the spindle. The grinder area of position vector circuit 22, material detector circuit 24, contour data base 28 and controller driver logic 26 may be implemented with a microprocessor.

Figure 2:
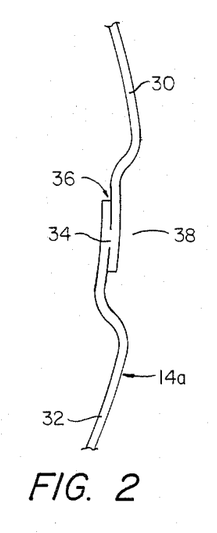
FIG. 2 is a diagrammatic elevational side of a portion of a contour with a welded filler channel.
Figure 3:
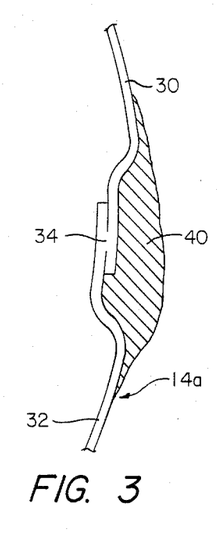
FIG. 3 is a view similar to FIG. 2 with the channel overfilled with a filler material.
Figure 4:
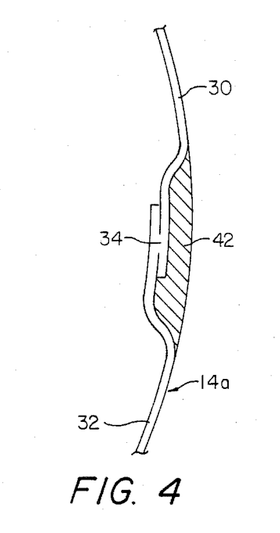
FIG. 4 is a view similar to FIGS. 2 and 3 with the filler material ground down to the contour.

The invention may be used for smoothing a surface and is especially useful for, but not limited to, smoothing a surface of dissimilar materials. Typically, steel auto body panels 30, 32, FIG. 2, are spot welded, 34, at a seam 36 which interrupts the auto body surface on contour 14a. Throughout the figures, like parts have been given like numbers and similar parts have been given like numbers accompanied by successive lower case letters. These seams are recessed to provide a channel 38 which subsequently receives a filler such as a body solder or lead 40, FIG. 3, which is applied liberally and overfills channel 38. The filler is then ground down until it is flush and smooth, FIG. 4, with the contour of the original sheet metal panels 30, 32, with the resulting smooth filler surface 42 between them. Typically, the width of the finished surface 42, FIG. 4, and trench 38 is approximately one inch. A typical grinder uses a disk with a diameter of approximately seven to nine inches, and the body sheet metal thickness is about 0.04 to 0.07 inch. Most typically, the contoured surfaces to be ground are compound curves, that is they curve in more than one direction.

Figures 5, 6, 7:
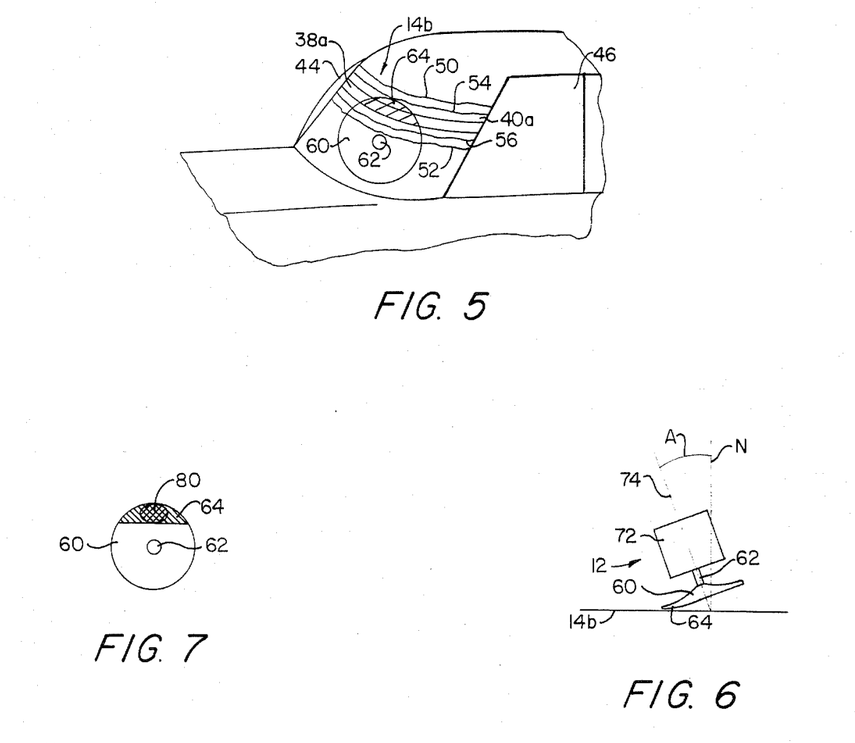
FIG. 5 is a diagrammatic view of the rear portion of an automobile showing a weld trench with a grinding disk positioned over it.
FIG. 6 is a diagrammatic view of a grinder device with its central axis tilted so that only a reduced area of the grinder disk contacts the contour to be ground.
FIG. 7 is a view of a grinder disk tilted as in FIG. 6 and in contact with a complex curved surface to show the further reduced contact area of the disk with the surface.

In a typical case, a weld trench 38a, FIG. 5, may run horizontally between the rear window 44 and side window 46 of an automobile. While trench 38a is only approximately one inch in width, the tinned area extends to the boundary 50, 52 to receive the body solder or lead within boundary 54, 56. Grinding is accomplished using a seven to nine inch grinding wheel 60 driven on a shaft 62, so that only a portion of the grinding wheel 64 actually contacts the lead 40a within the lead boundary area 54, 56. This reduced area contact 64 is shown more clearly in FIG. 6, where it can be seen that it occurs because the grinder device 12, including grinder motor 72 and grinding wheel 60, are tilted so that the central line 74 of the grinder device makes an angle A with the normal N to the contour 14b to be ground. The angle A may vary from five to as much as sixty degrees, but in this automated system the angle A is generally in the range of five to fifteen degrees.

Because the contour to be ground is typically a complex surface, that is, one which is curved in two directions, the area of contact is reduced even further from that shown at 64 to the smaller area 80, FIG. 7, which is contained within area 64.

Figure 8:
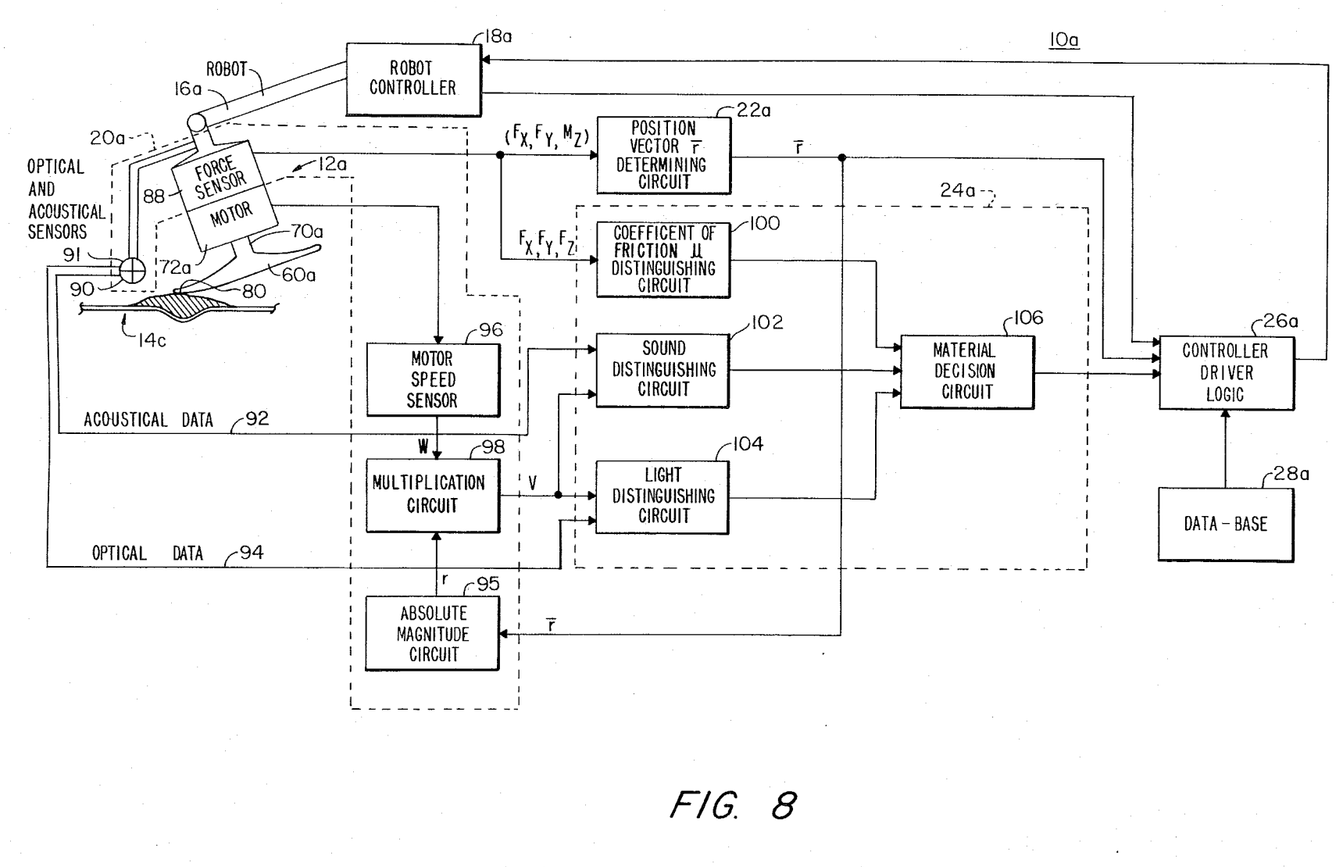
FIG. 8 is a more detailed diagram of one implementation of the system shown in FIG. 1.

In a more specific construction of system 10a, FIG. 8, grinder monitor circuit 20a includes force sensor 88, whose output is connected directly to position vector r determining circuit 22a. Grinder monitor circuit 20a also includes optical 91 and acoustical 90 sensors, whose acoustical output is provided on line 92 and whose optical output is provided on line 94. Grinder monitor circuit 20a also includes a motor speed sensor 96 which detects the speed of motor 72a, and a multiplication circuit 98 which multiplies the motor speed from motor sensor 96 by the absolute value r provided by absolute magnitude circuit 95 from its input, vector $\bar{r}$.

The preferred construction with reference to FIG. 8 uses but one of the sensing channels for distinguishing the material being ground, as for example the light detection system.

Figure 9:
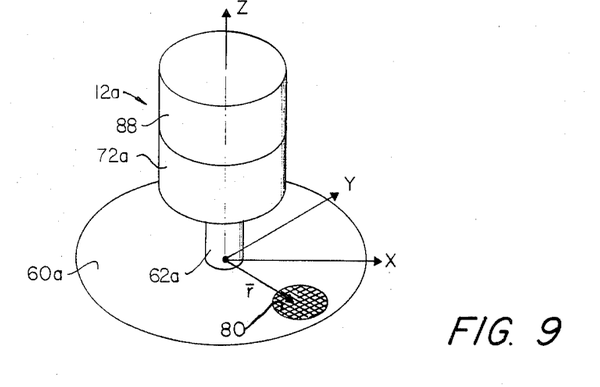
FIG. 9 is a diagrammatic view showing the axes of the forces sensed by the force sensor mounted with the grinder device.

Force sensor 88 provides at its output forces which occur relative to the axes of grinder 12a. The axes, X, Y and Z of force sensor 88, are shown in FIG. 9 along with vector r and area 80. A typical force sensor that may be used to implement force sensor 88, is disclosed in U.S. Pat. No. 4,094,192 and is capable of providing all the forces $F_x$, $F_y$, $F_z$, and moments $M_x$, $M_y$ and $M_z$ about the relative axes of grinder 12a. Position vector $\bar{r}$ determining circuit 22a receives its input the value of $F_x$, $F_y$ and $M_z$ from force sensor 88 and calculates $\bar{r}$ according to the expression:

$$\bar{r} = \left( \frac{M_z F_y}{F_x^2 + F_y^2} \right) \bar{i} + \left( \frac{M_z F_x}{F_x^2 + F_y^2} \right) \bar{j}$$

It provides this position vector $\bar{r}$ to both the absolute magnitude circuit 95 and controller driver logic 26a. Material detection circuit 24a may include one or more circuits for distinguishing the material being ground, such as coefficient of friction distinguishing circuit 100, sound distinguishing circuit 102 and light distinguishing circuit 104, as well as other circuits which may be used to distinguish characteristics of the grinding activity, for example such as a circuit which determines the transverse shape of the contour being ground from the output of the force sensor and compares it to a desired contour shape and indicates that the task has been accomplished when the two shapes coincide. The distinguishing circuits 100, 102 and 104 may be used singly or in any combination. If two or more of them are used, then a material decision circuit 106 is also used to make a determination of a material being ground in accordance with the outputs of the two or more distinguishing circuits provided.

The coefficient of friction $\mu$ of distinguishing circuit 100 receives the input $F_x$, $F_y$ and $F_z$ from force sensor 88 and calculates $\mu$ according to the expression:

$$\mu \cong \frac{\sqrt{F_x^2 + F_y^2}}{F_z}$$

Sound distinguishing circuit 102 responds to the acoustical data on line 92 from acoustical sensor 90, and the velocity of the area 80 to provide an indication of the material being ground. Optical sensor 91 provides the optical data on line 94 in conjunction with the speed and velocity v of area 80 to light-distinguishing circuit 104, which indicates the material being ground.

The detection by the coefficient of friction distinguishing circuit 100 is facilitated by the fact that, in the case of the auto body grinding, lead has a different coefficient of friction than steel, and therefore the forces $F_x$, $F_y$ and $F_z$ will vary depending upon which of the two materials is being encountered by the grinder. The sound of steel being ground is different than the sound of lead being ground, and their respective spectra are distinguished as a basis for the operation of the sound distinguishing circuit 102. The sounds given off by steel and lead as they are being ground vary with the velocity v, which is an input to sound distinguishing circuit 102.

In a similar fashion, when the grinder encounters a steel surface, sparks will be given off provided the speed of the grinding area 80 is sufficient. No such sparks will be given off when the grinder encounters lead at that speed, and this is the basis for the operation of the light distinguishing circuit 104.

Figure 10:
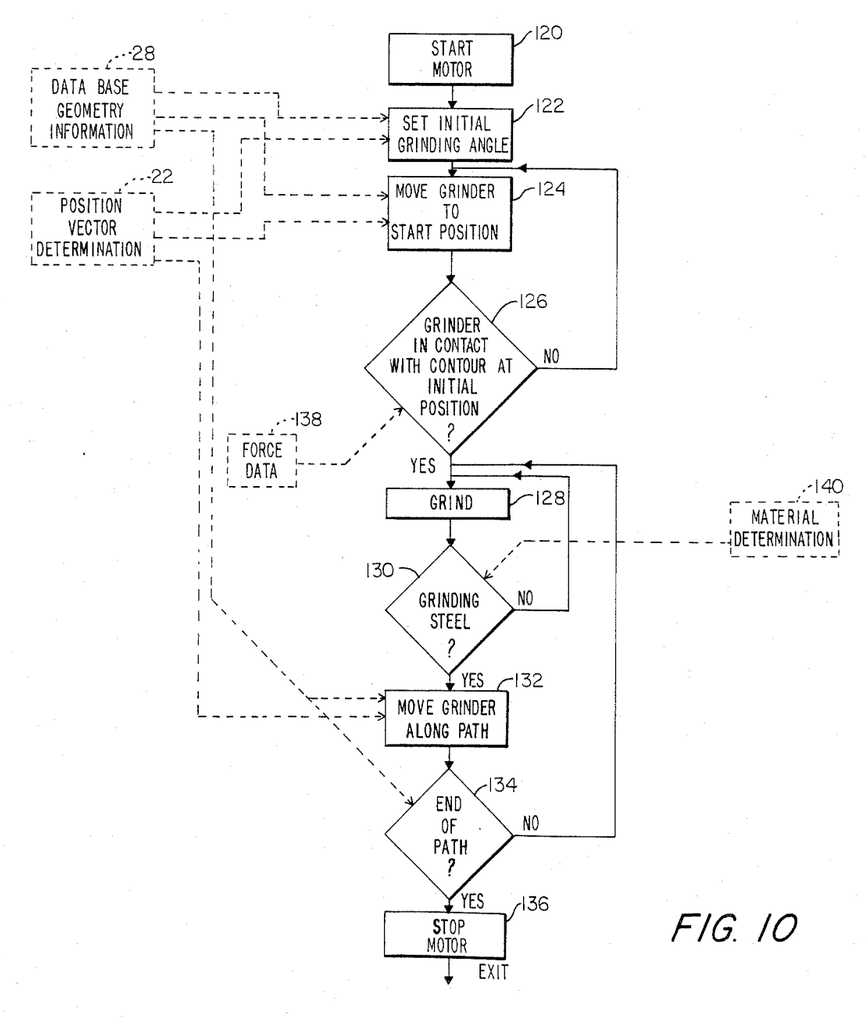
FIG. 10 is a flow chart of the software used in the controller driver logic of FIGS. 1 and 8.

The output from material detector circuit 24a, or from material decision circuit 106 if it is employed, is fed directly to the controller driver logic 26a along with the position vector $\bar{r}$. Along with these outputs and the output from data base 28a, controller driver logic 26a is programmed in accordance with the flow chart shown in FIG. 10, in which the motor is started, step 120, the initial grinding angle is set, step 122, and the grinder is moved to the starter position in step 124. Then the inquiry is made as to whether the grinder is in contact with the contour at the initial position, step 126. If the answer is no, the system returns to step 124. If it is yes, the command is given to grind in step 128. Then the inquiry is made as to whether the grinder is grinding a specific metal, for example steel, in step 130. If the response is no, the system returns to step 128. If it is yes, the grinder is moved along a predetermined path, step 132. Inquiry is made as to whether the end of the path has been reached, step 134. If it has not the system returns to step 128. If it has, the motor is stopped in step 136 and the routine is exited. The steps of setting the initial grinding angle, 122, and moving the grinder to the start position, 124, each requires geometry information from the data base 28, and the position vector determination information from circuit 22, which are also drawn upon in the performance of step 132. Force data 138, typically derived from force sensor 88 and then further processed, is used in the performance of step 126. In step 130, a material determination 140 may be accomplished in addition to the simple task of determining whether or not the material is steel. The data base geometry information is also used in the performance of the End of Path step 134.

Figures 11A, 11B:
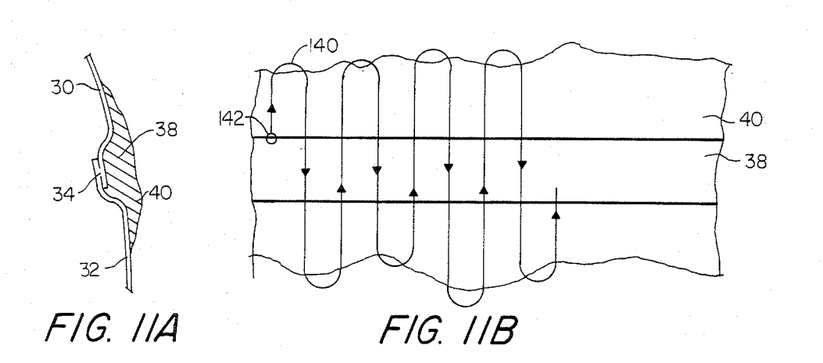
FIGS. 11A and 11B are side and front views of a weld trench illustrating one grinding path for which the controller driver logic may be programmed.
Figure 12A:
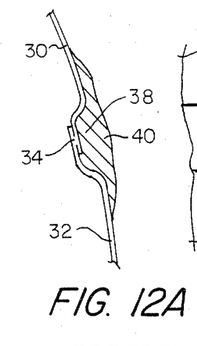
FIGS. 12A and 12B are views similar to FIGS. 11A and B showing an alternative grinder path.
Figure 12B:
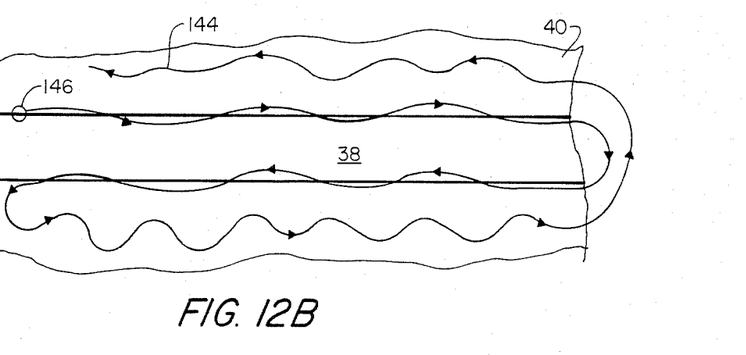

A typical path is shown in FIGS. 11A and 11B, where there is illustrated at the left a profile of the contour formed by sheet metal 30, 32 with a trench 38 filled with lead 40. To the right of this profile, there is shown a front view of channel 38 and a typical path 140, which moves laterally across channel 38 and has a starting point 142. The path is not limited to the path shown in FIG. 11B. Any suitable path may be used, for example as shown in FIGS. 12A and B, where the path 144 begins at point 146 and runs longitudinally back and forth more or less parallel to channel 38.

Figure 13:
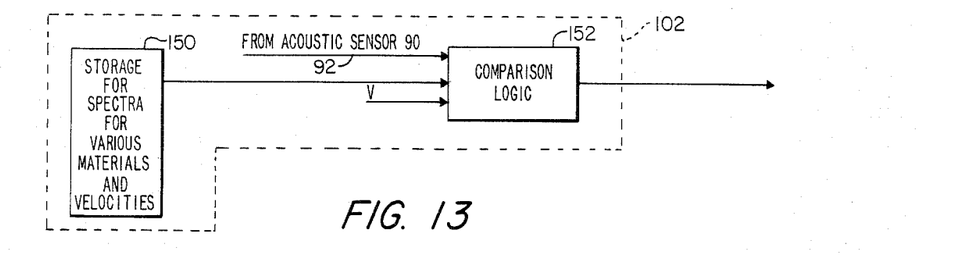
FIG. 13 is a more detailed block diagram of the sound distinguishing circuit of FIG. 8.
Figure 14:
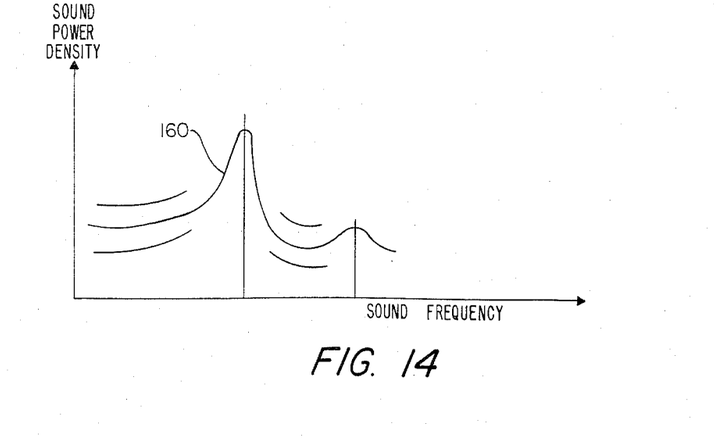
FIG. 14 is an illustration of the sound spectrum produced by the grinding of a contour which shifts as a function of the velocity of the area of contact between the grinder disk and the contour being ground.

Sound distinguishing circuit 102 may include a memory having a storage for spectra of various materials and velocities 150, FIG. 13, which provides one input to comparison logic 152 in conjunction with the information from acoustic sensor 90 on line 92 and the velocity v from which the distinction between the lead and the steel can be made. The input of velocity v is required because the audio spectrum 160, FIG. 14, shifts in accordance with the speed of the grinding area 80.

Figure 15:
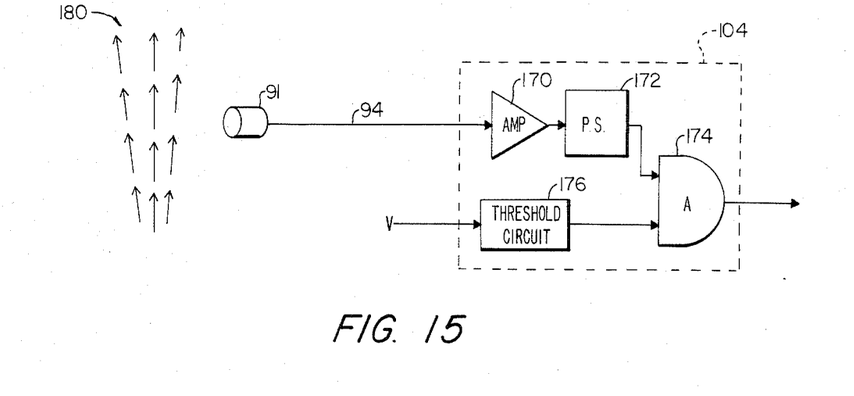
FIG. 15 is a more detailed block diagram of the light distinguishing circuit of FIG. 8.

Light distinguishing circuit 104 may include an amplifier 170, FIG. 15, which receives the output on line 94 from optical detector 91 and submits it to pulse shaping circuit 172 before it is delivered to one input of AND gate 174. The other input to AND gate 174 is delivered by threshold circuit 176, whose input is the velocity v derived from multiplication circuit 98, FIG. 8. Optical detector circuit 91 looks for sparks incident to steel grinding as the material, such as grinding dust indicated by the cluster of arrows 180, is thrown from the rotating disk. Below a certain speed no sparking occurs. Thus if the velocity v of threshold circuit 176 exceeds the predetermined threshold and there is an output on line 94, then AND gate 174 will indicate that steel is being ground.

Figure 16:
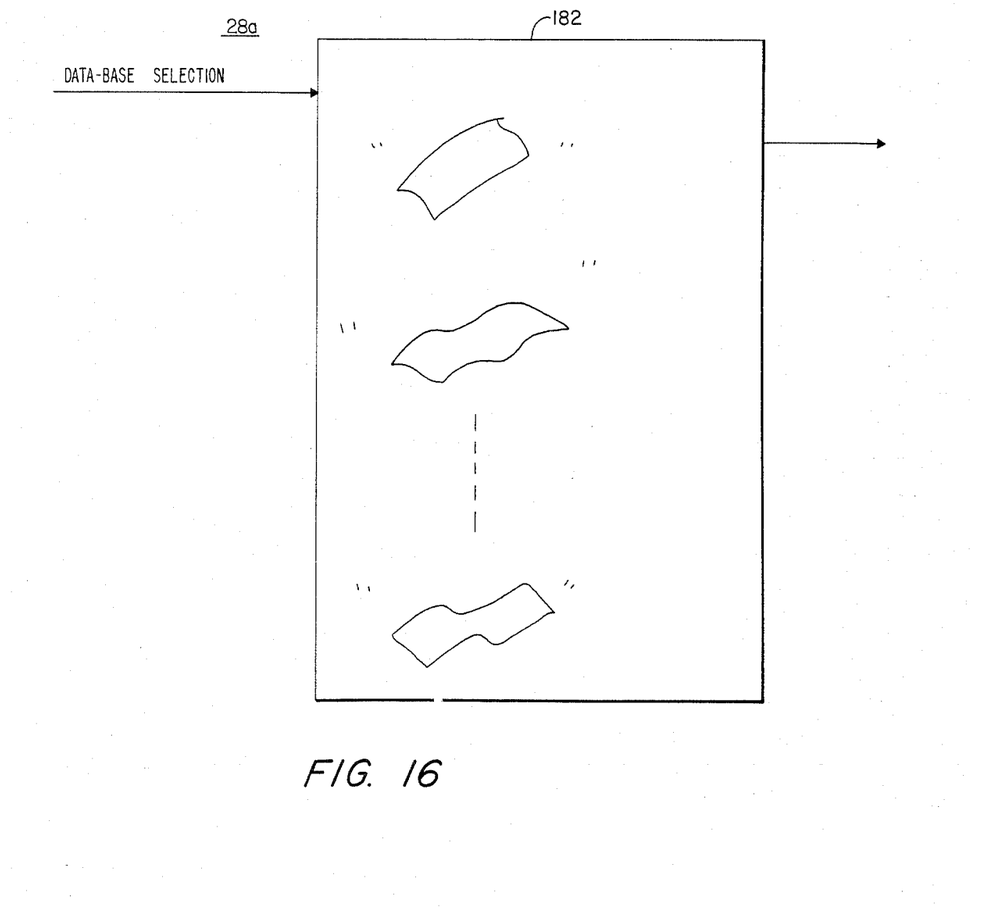
FIG. 16 is a more detailed diagram of the data base for a predetermined shape of the piece being ground of FIG. 8.

A data base for a predetermined shape of the piece being ground, 28a, FIG. 16, may be simply a programmable ROM 182, which contains the data base describing the piece to be ground. Stored information in ROM 182 provides a geometric description of the body shape and the body orientation. The information in ROM 182 may be determined with respect to the exact location and orientation of the workpiece or from sensing trials such as can be performed with robot 16a using force sensor 88 and grinder 12a with the grinding disk or wheel 60 not rotating.

Other embodiments will occur to those skilled in the art and are within the following claims:

What is claimed is:

1. An automatic contour grinding system for smoothing a surface, comprising:
   a robot;
   a robot controller;
   a grinder device mounted to said robot;
   means for monitoring the grinding action of said grinder device;
   means, responsive to said means for monitoring, for determining the vector position of the grinder area in contact with the contour to be smoothed with respect to the grinder spindle;
   means, responsive to said means for monitoring, for detecting the material being ground;
   a contour data base for providing the shape of the contour being ground; and
   a controller driver unit responsive to said contour data base, said means for determining the vector position, and said means for detecting for driving said grinder device to grind until there is achieved the shape of the contour being ground.

2. The system of claim 1 in which said means for monitoring includes a force sensor for sensing forces occurring relative to the grinder axes.

3. The system of claim 2 in which said force sensor provides the forces $F_x$ and $F_y$ and the moment $M_z$.

4. The system of claim 3 in which said means for determining the vector position includes means for calculating the vector $$\bar{r} = \left(\frac{M_z F_y}{F_x^2 + F_y^2}\right)\bar{i} + \left(\frac{M_z F_x}{F_x^2 + F_y^2}\right)\bar{j}$$

5. The system of claim 2 in which said force sensor provides the forces $F_x$, $F_y$, and $F_z$.

6. The system of claim 5 in which said means for detecting includes means for distinguishing the coefficient of friction of the material being ground.

7. The system of claim 6 in whch said means for distinguishing includes means for calculating the coefficient of friction $\mu$ $$\mu \simeq \frac{\sqrt{F_x^2 + F_y^2}}{F_z}$$

of the material being ground.

8. The system of claim 1 in which said means for monitoring includes an acoustical sensor for sensing the sound of the material being ground.

9. The system of claim 8 in which said means for monitoring includes means for indicating the speed of the grinder area in contact with the contour to be ground.

10. The system of claim 9 in which said means for detecting includes means, responsive to said acoustical sensor and said means for indicating the speed, for distinguishing the sounds of the material being ground.

11. The system of claim 1 in which said means for monitoring includes an optical sensor for sensing light generated by the material being ground.

12. The system of claim 11 in which said means for monitoring includes means for indicating the speed of the grinder area in contact with the contour to be ground.

13. The system of claim 12 in which said means for detecting includes means, responsive to said optical sensor and said means for indicating the speed, for distinguishing the light produced by the material being ground.

14. The system of claim 1 in which said controller driver unit includes means for establishing a path of travel for said grinder device over the contour to be ground; means for controlling the angle of the grinder relative to the contour; and means for defining when the contour grinding is completed.

15. An automatic grinding contour system for smoothing a surface comprising:
   a robot;
   a robot controller;
   a grinder device mounted to said robot;
   a force sensor for sensing forces occurring relative to the grinder axes;
   means, responsive to said force sensor, for determining the vector position of the grinder areas in contact with the contour to be smoothed;
   means, responsive to said force sensor, for distinguishing the coefficient of friction of the material being ground;
   a contour data base for providing the shape of the contour being ground; and
   a controller driver unit responsive to said contour data base, said means for determining the vector position, and said means for distinguishing the coefficient of friction, for driving said grinder device to grind until there is achieved the shape of the contour being ground.

16. The system of claim 15 in which said force sensor provides the forces $F_x$, $F_y$, and $F_z$.

17. The system of claim 16 in which said means for distinguishing includes means for calculating the coefficient of friction $$\mu \simeq \frac{\sqrt{F_x^2 + F_y^2}}{F_z}$$

of a material being ground.

18. An automatic contour grinding system for smoothing a surface comprising:
   a robot;
   a robot controller;
   a grinder device mounted to said robot;
   means for monitoring the grinding action of said grinder device including a force sensor for sensing forces occurring relative to the grinder axes; and an acoustical sensor for sensing the sound of the material being ground;
   means, responsive to said force sensor, for determining the vector position of the grinder area in contact with the contour to be smoothed;
   means, responsive to said acoustical sensor, for distinguishing the sound of the material being ground;
   a contour data base for providing the shape of the contour being ground; and a controller driver unit, responsive to said contour data base, said means for determining the vector position, and said means for distinguishing the sound, for driving said grinder device to grind until there is achieved the shape of the contour being ground.

19. The system of claim 18 in which said means for monitoring includes means for indicating the speed of the grinder area in contact with the contour to be ground.

20. An automatic contour grinding system for smoothing a surface comprising:
   a robot;
   a robot controller;
   a grinder device mounted to said robot;
   means for monitoring the grinding action of said grinder device including a force sensor for sensing forces occurring relative to the grinder axes; and an optical sensor for sensing light generated by the material being ground;
   means, responsive to said force sensor, for determining the vector position of the grinder area in contact with the contour to be smoothed;
   means, responsive to said optical sensor for distinguishing the light produced by the material being ground;
   a contour data base for providing the shape of the contour being ground;
   a controller driver unit responsive to said contour data base; said means for determining the vector position; and said means for distinguishing the light produced, for driving said grinder device to grind until there is achieved the shape of the contour being ground.

21. The system of claim 20 in which said means for monitoring includes means for indicating the speed of the grinder area in contact with the contour to be ground.

22. An automatic contour grinding system for smoothing a surface of dissimilar materials comprising:
   a robot;
   a robot controller;
   a grinder device mounted to said robot;
   means for monitoring the grinding action of said grinder device including a force sensor for sensing forces occurring relative to the grinder axes; and an acoustical sensor for sensing the sound of the material being ground;
   means, responsive to said force sensor, for determining the vector position of the grinder area in contact with the contour to be smoothed;
   means for detecting which material is being ground including means, responsive to said force sensor, for distinguishing the coefficient of friction of the material being ground, and means, responsive to said acoustical sensor, for distinguishing the sound of the material being ground; said means for detecting further including means, responsive to said means for distinguishing the coefficient of friction and said means for distinguishing the sound, for deciding the material, being ground;
   a contour data base for providing the shape of the contour being ground; and
   a controller drive unit, responsive to said contour data base, said means for determining vector position, and said means for deciding for driving said grinder device to grind until there is achieved the shape of the contour being ground.

23. The system of claim 22 in which said means for monitoring includes means for indicating the speed of the grinder area in contact with the contour to be ground.

24. An automatic contour grinding system for smoothing a surface of dissimilar materials comprising:
   a robot;
   a robot controller;
   a grinder device mounted to said robot;
   means for monitoring the grinding action of said grinder device including a force sensor for sensing forces occurring relative to the grinder axes; and an optical sensor for sensing light generated by the material being ground;
   means, responsive to said force sensor, for determining the vector position of the grinder area in contact with the contour to be smoothed;
   means for detecting which material is being ground including means, responsive to said force sensor, for distinguishing the coefficient of friction of the material being ground, and means, responsive to said optical sensor, for distinguishing the light produced by the material being ground; said means for detecting further including means, responsive to said means for distinguishing the coefficient of friction and said means for distinguishing the light, for deciding the material being ground;
   a contour data base for providing the shape of the contour being ground; and
   a controller driver unit, responsive to said contour data base, said means for determining vector position, and said means for deciding, for driving said grinder device to grind until there is achieved the shape of the contour being ground.

25. The system of claim 24 in which said means for monitoring includes means for indicating the speed of the grinder area in contact with the contour to be ground.

26. An automatic contour grinding system for smoothing a surface of dissimilar materials comprising:
   a robot;
   a robot controller;
   a grinder device mounted to said robot;
   means for monitoring the grinding action of said grinder device including a force sensor for sensing forces occurring relative to the grinder axes; an optical sensor for sensing light generated by the material being ground; and an acoustical sensor for sensing the sound generated by the material being ground;
   means, responsive to said force sensor, for determining the vector position of the grinder area in contact with the contour to be smoothed;
   means for detecting which material is being ground including means, responsive to said acoustical sensor, for distinguishing the sound of the material being ground and means, responsive to said optical sensor and said means for indicating speed, for distinguishing the light produced by the materials being ground; said means for detecting further including means, responsive to said means for distinguishing the light and said means for distinguishing the sound, for deciding the material being ground;
   a contour data base for providing the shape of the contour being ground; and
   a controller driver unit, responsive to said contour data base, said means for determining vector position, and said means for deciding, for driving said grinder device to grind until there is achieved the shape of the contour being ground.

27. The system of claim 26 in which said means for monitoring includes means for indicating the speed of the grinder area in contact with the contour to be ground.

28. An automatic contour grinding system for smoothing a surface of dissimilar materials comprising:
a robot;
a robot controller;
a grinder device mounted to said robot;
means for monitoring the grinding action of said grinder device including a force sensor for sensing forces occurring relative to the grinder axes; an optical sensor for sensing light generated by the material being ground; and an acoustical sensor for sensing the sound generated by the material being ground;
means, responsive to said force sensor, for determining the vector position of the grinder area in contact with the contour to be smoothed;
means for detecting which material is being ground including means, responsive to said force sensor, for distinguishing the coefficients of friction of the materials being ground; means, responsive to said acoustical sensor, for distinguishing the sound of the material being ground; and means, responsive to said optical sensor and said means for indicating speed, for distinguishing the light produced by the materials being ground; said means for detecting further including means, responsive to said means for distinguishing the coefficient of friction; said means for distinguishing the light; and said means for distinguishing the sound, for deciding the material being ground;
a contour data base for providing the shape of the contour being ground; and
a controller driver unit, responsive to said contour data base, said means for determining vector position, and said means for deciding, for driving said grinder device to grind until there is achieved the shape of the contour being ground.

29. The system of claim 28 in which said means for monitoring includes means for indicating the speed of the grinder area in contact with the contour to be ground.

30. An automatic contour grinding system for smoothing a surface comprising:
a robot;
a robot controller;
a grinder device mounted to said robot;
means for monitoring the grinding action of said grinder device including a sensor for sensing $F_x$, $F_y$ and $M_z$ relative to the grinder axes;
means, responsive to said means for monitoring, for determining the vector position of the grinder area in contact with the contour to be smoothed, said means for determining including means for calculating the vector $$\bar{r} = \left( \frac{M_z F_y}{F_x^2 + F_y^2} \right) \bar{i} + \left( \frac{M_z F_x}{F_x^2 + F_y^2} \right) \bar{j}$$

means, responsive to said means for monitoring, for detecting the material being ground;
a contour data base for providing the shape of the contour being ground; and
a controller driver unit responsive to said contour data base, said means for determining the vector position; and said means for detecting, for driving said grinder device to grind until there is achieved the shape of the contour being ground.

31. An automatic contour grinding system for smoothing a surface comprising:
a robot;
a robot controller;
a grinder device mounted to said robot;
means for monitoring the grinding action of said grinder device including an optical sensor for sensing light generated by the material being ground; and an acoustical sensor for sensing the sound generated by the material being ground;
means, responsive to said means for monitoring, for determining the vector position of the grinder area in contact with the contour to be smoothed;
means, responsive to said acoustical sensor, for distinguishing the sound of the material being ground and means, responsive to said optical sensor, for distinguishing the light produced by the materials being ground;
a contour data base for providing the shape of the contour being ground; and
a controller driver unit, responsive to said contour data base, said means for determining vector position, and said means for deciding, for driving said grinder device to grind until there is achieved the shape of the contour being ground.

32. The system of claim 31 in which said means for monitoring includes means for indicating the speed of the grinder area in contact with the contour to be ground.

33. An automatic contour grinding system for smoothing a surface of dissimilar materials comprising:
a robot;
a robot controller;
a grinder device mounted to said robot;
means for monitoring the grinding action of said grinder device including an optical sensor for sensing light generated by the material being ground; and an acoustical sensor for sensing the sound generated by the material being ground;
means, responsive to said means for monitoring, for determining the vector position of the grinder area in contact with the contour to be smoothed;
means, responsive to said acoustical sensor, for distinguishing the sound of the material being ground and means, responsive to said optical sensor, for distinguishing the light produced by the materials being ground; said means for detecting further including means, responsive to said means for distinguishing the light and said means for distinguishing the sound, for deciding the material being ground;
a contour data base for providing the shape of the contour being ground; and
a controller driver unit, responsive to said contour data base, said means for determining vector position, and said means for deciding, for driving said grinder device to grind until there is achieved the shape of the contour being ground.

34. The system of claim 33 in which said means for monitoring includes means for indicating the speed of the grinder area in contact with the contour to be ground.

35. An automatic contour grinding system for smoothing a junction of dissimilar materials comprising:
 a robot;
 a robot controller;
 a grinder device mounted to said robot;
 means for monitoring the grinding action of said grinder device;
 means, responsive to said means for monitoring, for determining the vector position of the grinder area in contact with the contour to be smoothed;
 means, responsive to said means for monitoring, for detecting which material is being ground;
 a contour data base for providing the shape of the contour being ground; and
 a controller driver unit responsive to said contour data base, said means for determining the vector position, and said means for detecting for driving said grinder device to grind along the junction until there is achieved the shape of the contour being ground.

* * * * *